March 13, 1956  W. C. VAN CLIEF, JR  2,737,703
BRUSH STRIP CUTTING APPARATUS
Filed Jan. 30, 1953  5 Sheets-Sheet 3
FIG. 3
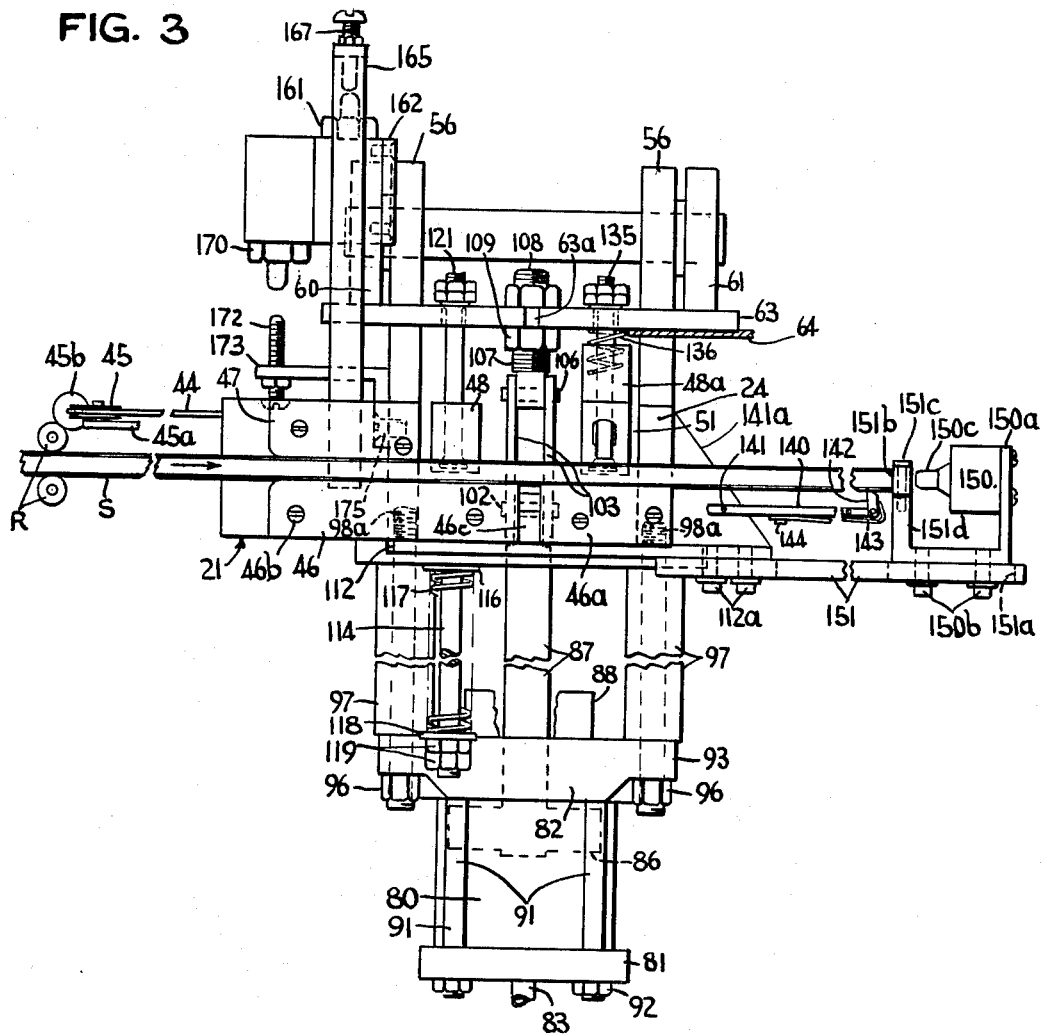
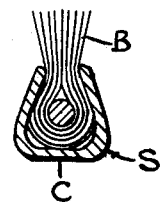
FIG. 8
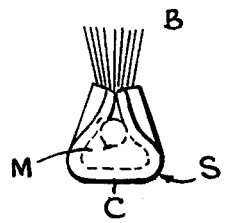
FIG. 9
INVENTOR.
WILLIAM C. VAN CLIEF, JR.
BY
Oscar L. Spencer
ATTORNEY March 13, 1956 W. C. VAN CLIEF, JR 2,737,703
BRUSH STRIP CUTTING APPARATUS
Filed Jan. 30, 1953 5 Sheets-Sheet 4
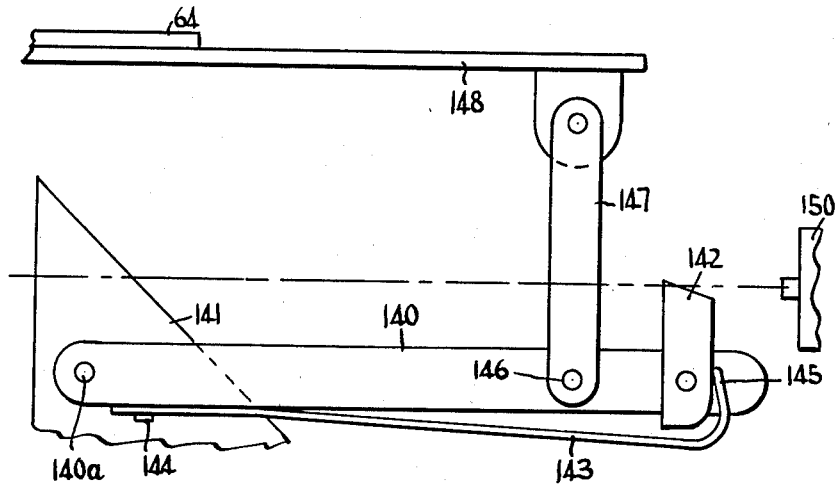
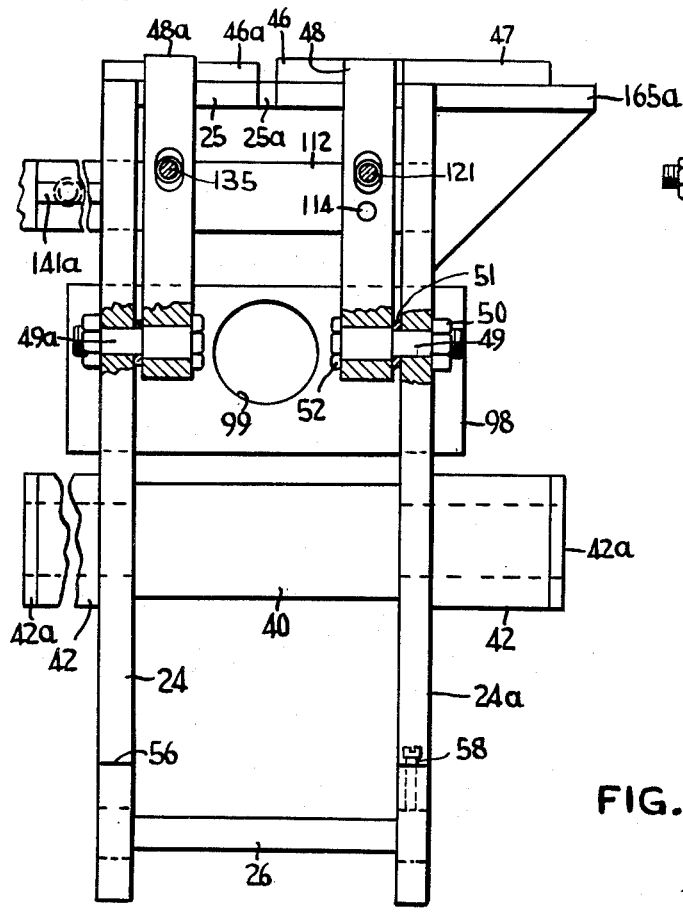
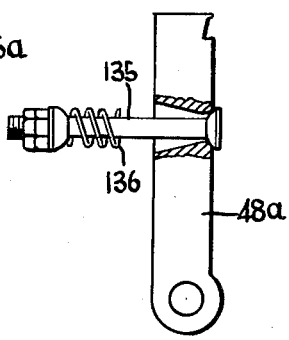
INVENTOR.
WILLIAM C. VAN CLIEF, JR.
BY
Oscar L. Spencer
ATTORNEY

United States Patent Office 2,737,703
Patented Mar. 13, 1956

2,737,703

BRUSH STRIP CUTTING APPARATUS

William C. Van Clief, Jr., Baltimore, Md., assignor to Pittsburgh Plate Glass Company, Allegheny County, Pa., a corporation of Pennsylvania Application January 30, 1953, Serial No. 334,275

11 Claims. (Cl. 29—69)

This invention relates to apparatus for cutting a continuously moving strip material into sections and it has particular relation to apparatus for cutting a continuously moving brush strip involving a continuous metallic channel with brush bristles secured therein, into sections of a length appropriate for the formation of conventional brushes.

An object of the invention is to provide automatic apparatus for cutting a brush channel of the foregoing type into sections by a sawing operation.

A second object of the invention is to provide apparatus for cutting a brush strip channel into sections by use of which sections of uniform length can be obtained.

A third object is to provide a method and apparatus for cutting channels of a brush bristle stock by use of which the bristles are at least in part fused in the channel and are thus secured from displacement.

These and other objects of the invention will be apparent from consideration of the following specification and the appended claims. The order of statement of the objects has no significance as to their importance. All objects need not necessarily be realized at all times.

It has heretofore been suggested to manufacture brushes appropriate for coating operations and similar applications, by continuously shaping a metallic tape or ribbon to channel form and inserting brush bristle stock, preferably of double-ended type, into the channel as it is formed. The resultant continuous strips of brush element are then cut into sections of appropriate length which are secured to a conventional handle to provide a brush.

The present invention concerns a cutting machine designed to sever the channels of the strip into sections of desired length without interruption of the various operations of forming the channel and securing the brush bristle material therein. In accordance with the invention, the apparatus comprises a carriage mounted to move with the continuously moving brush bristle strip, a saw upon the carriage and being adapted to move across the brush bristle strip while the latter is in longitudinal movement and automatic means designed to measure out sections of brush bristle strip of desired length, then to initiate operation of the saw and subsequently, at the conclusion of the cutting operation, to return the several elements of the apparatus to their initial or starting position.

For a better understanding of the invention reference may now be had to the accompanying drawings, in which like numerals refer to like parts throughout and in which:

Figure 3 is a fragmentary plan view of the apparatus shown in Figures 1 and 2.

Figure 4 is a fragmentary detail view of the reciprocating carriage.

Figure 5 is a detail view of a jaw and the operating mechanism attendant thereto for gripping the severed portion of stock.

Figure 6 is a detail view of an ejector mechanism.

Figure 8 is a sectional view of a piece of stock to be cut.

Figure 9 is an end view of a piece of severed stock.

Figure 10 is a fragmentary view of a portion of the apparatus as shown in Figures 1 and 2 of the drawings.

Figure 2:
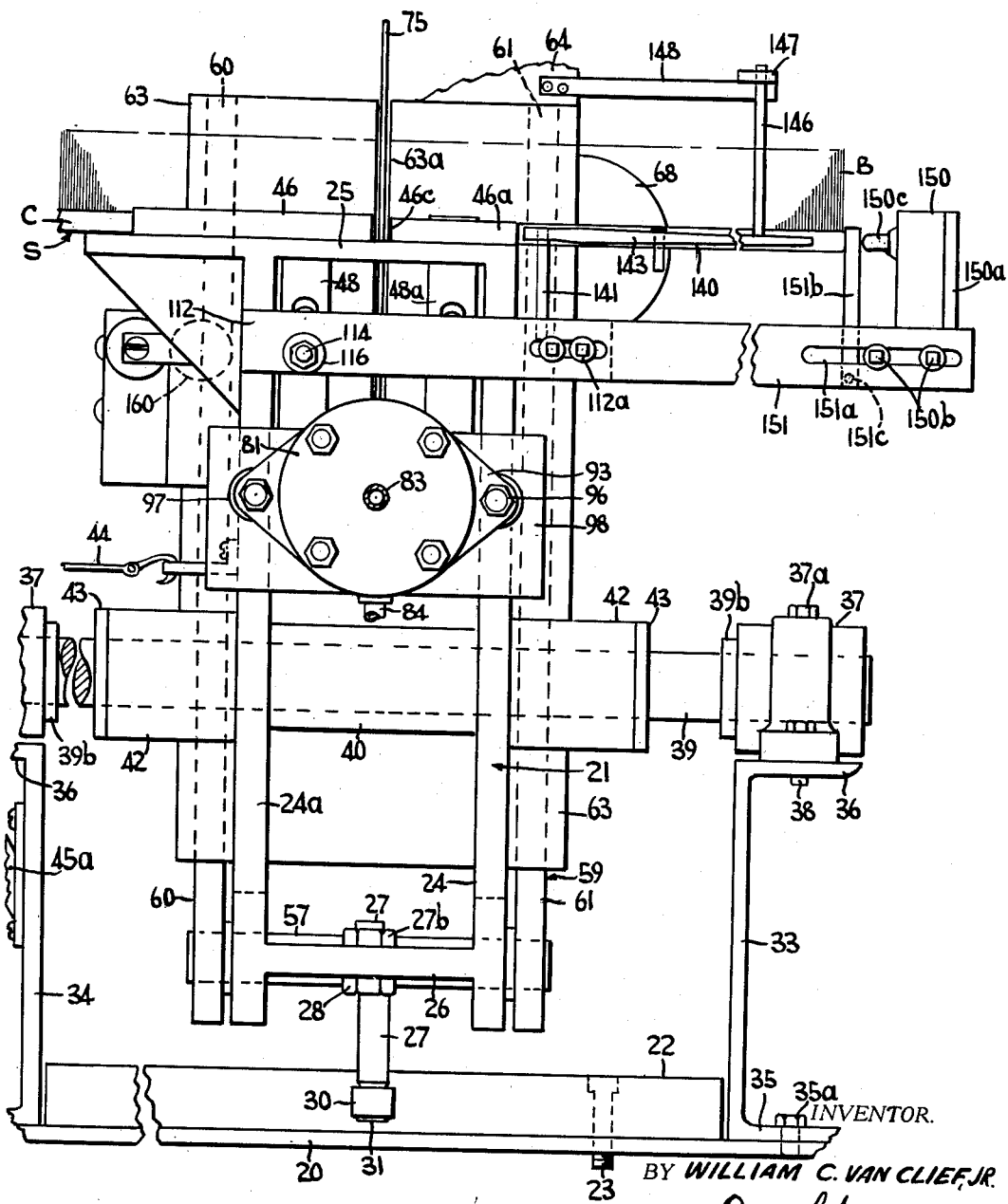
Figure 2 is a side elevational view of the apparatus as shown in Figure 1.

Apparatus for cutting brush strip S continuously fed forward by means such as driven rollers R comprise a base or pedestal 20 and a longitudinally reciprocating carriage 21, comprising a frame mounted thereupon. Movement of the carriage is directed by means including a guide bar 22 secured upon the base by means of screws or bolts 23. The frame as shown in Figure 2 includes sides 24 and 24a and upper and lower crossbars or webs 25 and 26 which may be formed as an integral casting or may be formed of separate parts appropriately secured together by bolts or screws or the like. The lower bar 26 is bored to receive stem portions 27a of pintle pins 27 which are screw-threaded to receive nuts 27b. The pintles are formed with enlarged intermediate portions 28 and the web 26 is clamped between these portions and the nuts. The lower portion of the pintles are offset as shown in Fig. 2 with respect to stem portion, to admit of transverse adjustment with respect to bar 22 and constitutes bearings for anti-friction rollers 30 which are secured thereupon by means of a set screw 31.

Means to support the frame 21 includes columns 33 and 34 which, in the form of the invention shown, are channel elements disposed upon their sides and having flanges 35 and 36, the lower of which (35) is secured to the base 20 by means of bolts 35a. Pillow blocks 37 are secured upon the upper flanges 36 by means of bolts 38 to receive a travel bar 39, preferably of circular section, secured in the pillow blocks by set screws 39a. This bar extends through a brushing 40, interconnecting the sides 24, 24a and also through housings 42 upon the outer sides of the sides 24 and 24a. Said housings receive ball bearings (not shown) which rotate in lubricant retained in the housing by felt seals 43. Washers 39b, of rubber or similar yielding material, cushion the arrest of motion of the carriage 21 on bar 39.

For purposes of urging the carriage forwardly upon the bar and thus to return it to its initial position at the conclusion of a cutting operation, a cable 44 is attached to the rear upright 24a and is trained over a pulley 45 (see Fig. 3) upon a bracket 45a on the column 34. A counterweight 45b is attached to the lower extremity of the cable and the weight thereof is adjusted to draw the entire carriage assembly to starting position at the end of a cutting stroke.

Guide means for directing a continuously advancing strip of brush stock S, comprising channel C and bristles B from which sections are to be severed, includes, as shown in Figure 3, fixed guide plates 46 and 46a disposed upon the cross-bar 25 of the frame 21 and being secured thereto by screws 46b. The guides are spaced slightly, as will be apparent at 46c to permit the passage of a saw blade later to be described. A slot 25a may also be formed in bar 25 for said saw. A rear fixed guide strip 47, is also secured to the bar 25 to coact with the strip 46 as a guide maintaining the continuous bristle strip in desired position. The guide srtips 46a and 47 may be formed with lips 47a engaging the top edges of channel C.

It will be observed that the guide strip 47 is somewhat shorter than the guide strip 46 thus providing a space for a movable clamping jaw arm 48, which is adapted to coact with the forward end of the guide 46, to clamp the continuously moving strip during a cutting operation. Synchronization in longitudinal movement between the carriage 21 and the strip, while the cutting saw (to be described) is in operation is thus obtained. At the conclusion of the cutting operation, the jaw is adapted to be released (by mechanism to be shown) from the strip S to allow the carriage to return to its initial position. The jaw arm 48, as shown in Figure 4, extends downwardly and at its lower extremity, is pivoted upon an enlarged bearing portion of a stud screw 49, that extends through the upright flange or web 24a and is provided with a nut 50, securing the stud screw in position. A washer 51, between the web 24a and the side of the jaw maintains adequate clearance between the surfaces of the two. A head 52, upon the screw prevents displacement of the jaw.

A jaw 48a similar to the jaw 48 is pivoted at its lower extremity to a stud screw 49a corresponding to the stud screw 49, already described, and this jaw, at its upper extremity, coacts with guide plate section 46a, to grip and steady the portion of a bristle strip section which is being severed and during the partial retraction of the saw (to be described). Mechanism to operate the jaws 48 and 48a in proper sequence with respect to the several elements of the saw mechanism will later be described.

It will be observed that the lower extremities of sides 24—24a of the carrier frame 21 are provided with laterally extending brackets 56, which are bored to receive a tubular hinge pin 57. One, or both, of the brackets 56 may also be bored and tapped as indicated in Figure 4, for a set screw or set screws 58 designed to the lock the pin from longitudinal displacement.

Figure 1:
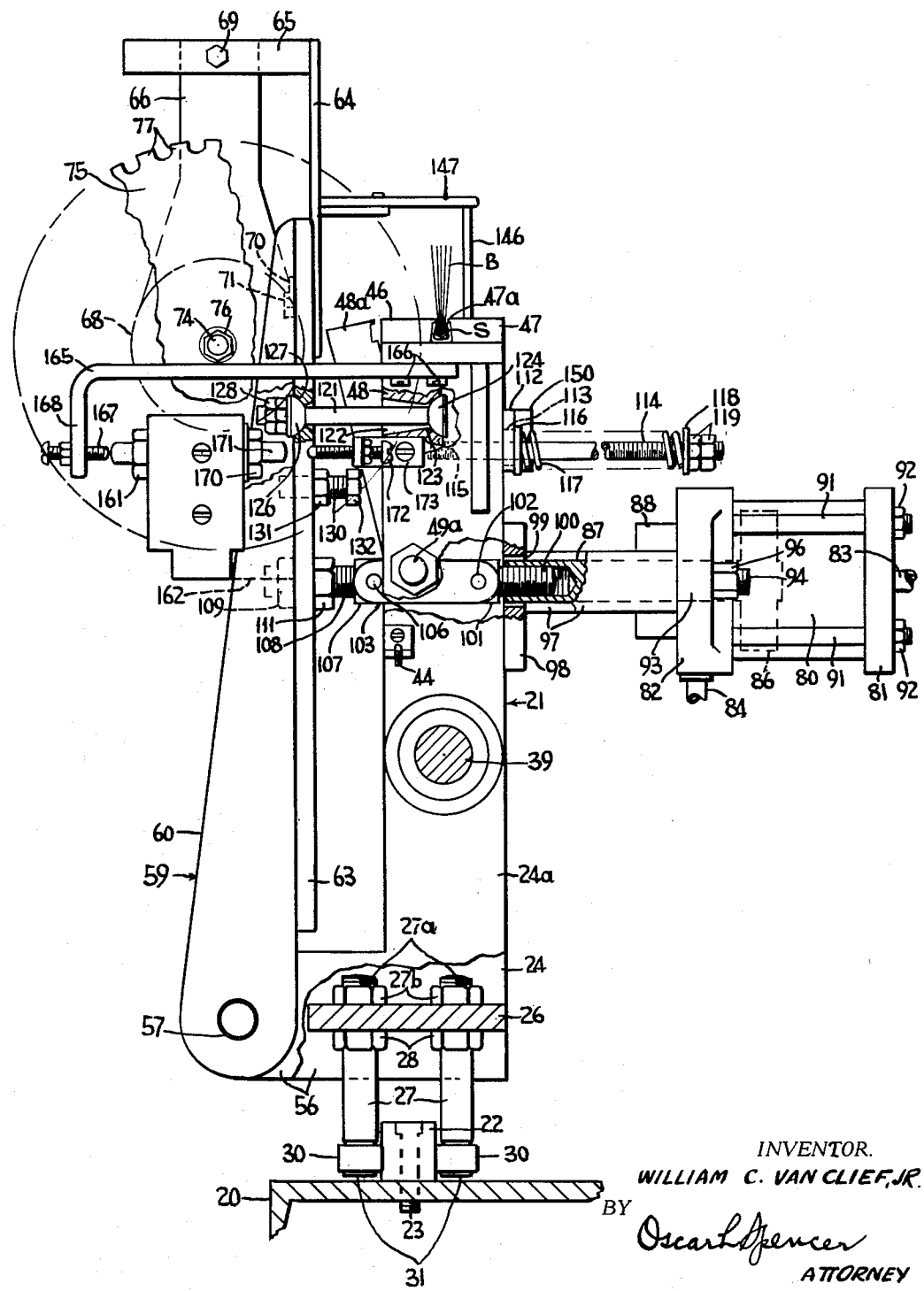
Figure 1 is an end elevational view of an appropriate embodiment of apparatus.

A swinging saw support or rocker assembly, indicated generally at 59 in Figures 1 and 2, is provided with parallel arms 60 and 61, which at their lower extremities are bored to rotate upon the ends of the hinge pin 57 which is parallel to the strip and provides an axis or pivot for rotation of the rocker assembly. The brackets 56 between the arms 60 and 61 of the rocker assembly prevent any type of movement between the carriage 21 and the assembly except that the assembly can rotate perpendicularly to the strip about the pin 57 as an axis. These arms are interconnected by a plate 63 having a slot 63a for a saw (to be described). The plate may be cast integrally with the arms, or attached by bolts or other means, as may be desired.

At its upper extremity, the plate 63 is provided with an upwardly extending plate or bracket 64, to which is secured a horizontally extending arm 65, having a mounting arm 66 of a saw-driving motor designated generally as 68, secured thereto by bolt means 69. This motor, as shown in Figure 1, may be provided upon one side with a base portion designated as 70, which is secured by bolts 71 or other appropriate means to the back of plate 63. Motor 68 is provided with shaft 74, upon which is mounted a circular saw 75, which is secured from axial displacement by means of clamping nuts 76, in a manner which will be readily apparent to those skilled in the art. This saw preferably is of the so-called friction type. That is, the teeth 77 thereof, are formed with little or no rake, and without points. Indeed, they are formed merely by spaced notches in the edge of an appropriate friction disc (usually of steel). Such disc, when driven at appropriate peripheral speed, for example 1 to 3 miles per minute, tends to generate a high temperature in advance of the cutting edge, which is sufficient actually locally to fuse the metal contiguous the cutting edge, thus softening the latter so that it is swept out by the notches in the edge of the disc without actual chipping or abrasion. Often the molten metal is carried partially or completely across the end of the metallic channel C, thus providing a bridge M shown in Figure 9, or partial bridge, which effectively secures the bristles in the channel. Such bridged end is shown in Figure 9. It is also a characteristic of the saw that the metal under the teeth is sufficiently heated to transfer a considerable amount of heat to the bristles within the channel. If the latter are formed of a thermoplastic material such as cellulose acetate or cellulose butyrate, or nylon or the like, the bristles contiguous to the cut may be fused at their butt portions into a solid coherent mass, thus substantially aiding in securing the bristles from loss at the ends of the channel.

Mechanism automatically to actuate the rocker assembly 59, to bring the saw against, or to move it from the channel, and to synchronize the movements of the assembly with gripping jaws 48 and 48a, will now be described. Such mechanism includes an air cylinder 80 having end elements 81 and 82 having inlets for hose lines 83 and 84 for a fluid such as air under compression, designed to actuate a piston head 86 in the cylinder. This head is secured to a piston rod 87 extending out through a stuffing box 88 (see Figure 1) upon the cylinder head 82.

Cylinder heads 81 and 82 laterally project beyond the cylinder 80 and are secured together by through bolts 91, having nuts 92 threaded upon the extremities thereof. Cylinder head 82 is further provided with projecting lobes 93, through which extend bolts 94 having nuts 96 upon the ends thereof, bearing against the outer faces of the lobes 93. The bolts 94 further extend through spacing sleeves 97, which at their outer ends bear against the inner faces of the lugs 93 and at their opposite ends bear against the outer face of a cross plate 98, which conveniently may be secured across the sides 24—24a, somewhat below the upper extremities thereof. Appropriate fastening means for plate 98 may include the bolts 94, above described, which at their inner ends extend through openings in the crossbar of plate 98, and as shown at 98a in Figure 10, are threaded into the vertical faces of the flanges or webs 24—24a so that the inner ends of the spacing sleeves 97 bear against the plate to hold the latter in position.

Piston 87 extends through opening 99 in plate 98 and at its inner end it is bored and tapped to receive a threaded stem 100, of a cross head 101, which as shown in Figures 1 and 3, is flattened and bored to receive a connecting pin 102 having spaced parallel links 103, disposed upon opposite sides thereof. This pin is locked from displacement by cotter pins or similar instrumentalities (not shown). The opposite ends of the links 103 are attached by pin 106 to crosshead 107 of a screw 108. The latter extends through plate 63 of rocker 59, below slot 63a, and is held in position by nuts 109 and 111, bearing upon the opposite faces of the plate.

Means continuously urging jaw 48 into engagement with a brush bristle strip passing between the guides 46 and 47, comprises a bar 112 disposed transversely across the sides 24—24a of frame 21 at a point above the bar 98. Opening 113, formed in the bar 112, is formed for a rod 114, which is screw-threaded at its inner extremity as indicated at 115, in the jaw 48. Washer 116 upon the rod covers the opening and provides a seat for a helical spring 117 disposed upon the rod and bearing at its outer extremity against a washer 118, which in turn bears against lock nuts 119.

Means to move jaw 48 to releasing position upon retraction of the saw-carrying rocker assembly 59, comprises a rod 121, which extends through a rearwardly flared opening 122 in the jaw arm 48, which opening has a rounded shoulder 123, constituting a seat for an approximately hemispherical head 124 upon the rod. This hemispherical head permits pivoting movement between the rod and the jaw. At its opposite end, the rod 121 is provided with a washer 126, also approximately of hemispherical outer surface, which bears against a corresponding surface in a socket 127 formed in the plate 63 contiguous to the upper end thereof. Washer 126 is securely maintained upon the rod 121 by means of lock nuts 128 threaded upon the latter.

It will be apparent that as the rocker assembly 59 is swung inwardly to advance the cutting saw against the channel of a brush bristle strip, the jaw 48 is urged by the spring 117 into engagement with the outer face of the channel, thus securely gripping the latter so that the entire carriage assembly 21 including rocker arm 59, is carried forward against the retraction of the weight 45b. Longitudinal movement between the work and the saw is thus prevented while the cut is being made. It will be apparent that as the saw advances farther into the work, movement of the jaw 48 is prevented by channel C of strip S. The rod 121 is free, however, to advance further by the movement of the saw rocker assembly. This movement is permitted, owing to the loose seating of the head 124 against the shoulder 123 of the opening in the rocker arm.

In order to limit inward movement of the rocker assembly and thus to prevent possible damage to the carriage mechanism by the saw, stop means may be provided, which in the embodiment of the invention shown, includes a stud screw 130 threaded in the plate 63 and being secured against dislodgement by vibration, by means of a lock nut 131. This screw is disposed with the head portion 132 thereof in position to engage upright web 24a at the conclusion of the cutting stroke.

In order to exert a mild gripping action upon a severed strip or section until the saw blade has been retracted from the cut, the jaw 48a is provided with a rod 135 corresponding in shape and mounting to the rod 121 and being disposed parallel thereto. A short length of helical spring 136 is disposed on this rod and near the end of, and for a short time after the cutting stroke, exerts pressure at its opposite ends respectively against the jaw 48a and the plate 63 so that, when the saw blade is actually in the cut, the jaw is held by the pressure of the spring against the severed section. At the conclusion of the cutting operation and shortly after the saw is retracted, but before it reaches the limit of its backward travel and before the jaw 48 is released, the pressure exerted upon the jaw by the spring is relaxed. The jaw 48a is thus permitted to open for removal of the severed section a moment before the jaw 48 is opened.

Mechanism positively to remove a severed section of brush bristle strip at the conclusion of the cutting operation, is illustrated in detail in Figure 6 and in working position in Figure 3. It includes an ejector arm 140, which at its rear end, is pivoted to swing in a horizontal plane upon a vertical post 141 on shelf or bracket 141a upon the forward vertical side 24 of the frame 21. This arm, at its forward end, is provided with a pivoted pawl 142 faced toward the strip of stock to be cut and being urged toward vertical position with respect to the arm by means of a leaf spring 143 which at its rear end is secured to the ejector arm by a screw 144 and at its forward end is provided with a hooked portion 145 bearing against the front face of the pawl. For purposes of swinging the ejector arm outwardly as the saw rocker arm 59 is retracted from cutting position, the arm is provided with a vertical pin 146 fitting loosely in a hole or socket in the arm and being rigidly connected at its upper end to a link 147 hinged or otherwise secured to a rigid arm 148, upon bracket 64 upon the plate or bracket 63.

It will be apparent that when the rocker structure 59 is in retracted position, pawl 142 projects into the path of the end of the stock to be severed. As the stock advances the pawl is shoved aside by channel C to permit the end of the stock to advance to predetermined position where it engages stop means (to be described). As the saw advances into the cut, the arm 140 is carried backwardly away from the channel C to permit the pawl 142 to swing to its vertical position. At the completion of the cut, as the saw is retracted, the arm is again swung toward the severed piece of channel and the pawl bearing against the side of the latter, causes the severed piece to be ejected from between the pivoted jaw 48a and the fixed jaw 46a.

Figure 7:
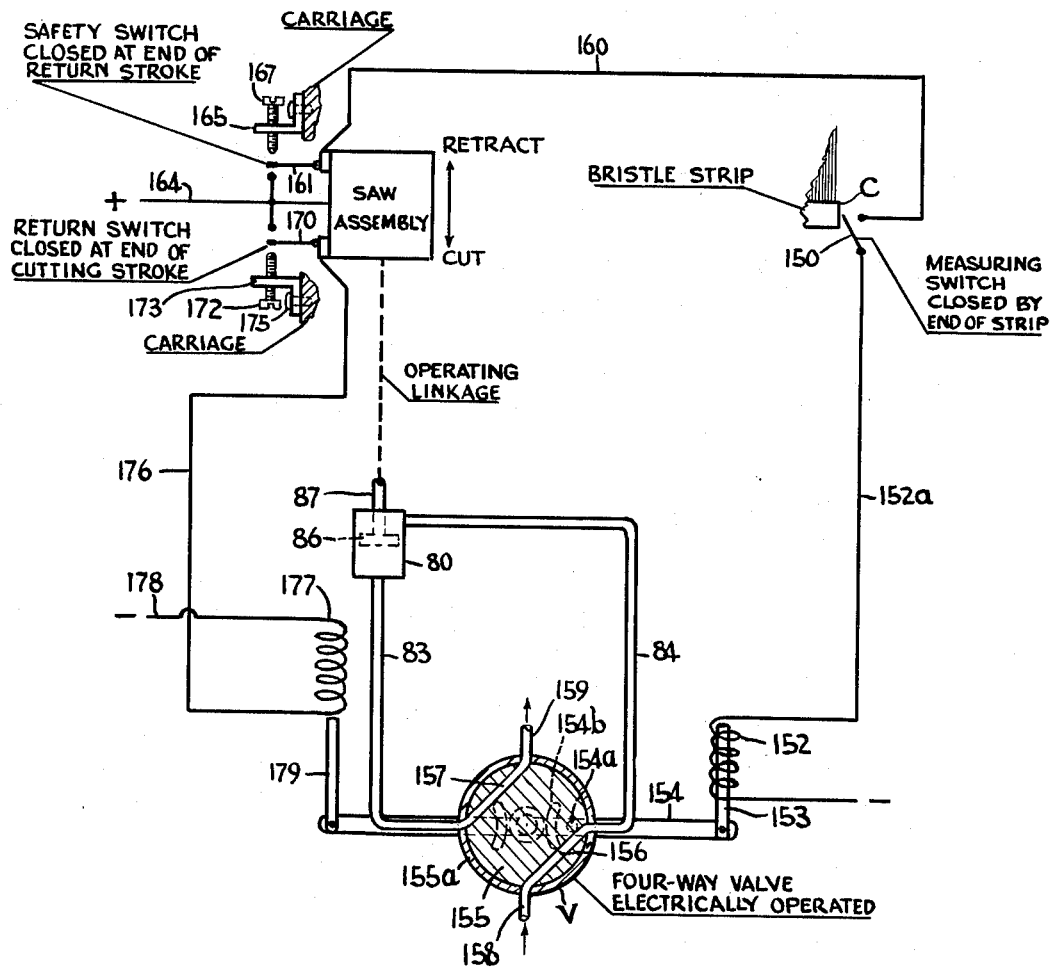
Figure 7 is a wiring diagram of the electrical and pneumatic controls of the apparatus.

Means, best shown in Figures 3 and 7, automatically to determine the proper length of strip to be severed and to operate the saw carrier arm 59 to effect the cut and to cause the return of the arm to its initial position, includes a conventional four-way valve V, diagrammatically illustrated, and being disposed in the pneumatic circuit of the air cylinder 80. The valve V is operated by solenoid means controlled by limit switches, preferably of the micro type, which now will be described. One such switch indicated at 150 is secured to bracket 150a, bolted upon a bar 151, which in turn constitutes an extension of, or is bolted adjustably, as indicated at 112a, to the bar 112. The microswitch is spaced from the plane of the saw 75 a proper distance to obtain the correct length of section to be severed from the brush bristle strip. Bracket 150a is secured for longitudinal adjustment upon the bar by bolts 150b operating in a slot 151a in the bar. A plate 151b, pivoted as indicated at 151c upon bracket flange 151d of bracket 150a, is disposed to be engaged by the advancing end of bristle strip and in turn, to engage button 160c of switch 150.

The switch 150 is connected by line 152a to a solenoid 152 to operate a plunger 153 which has appropriate connection through lever 154, pivoted at 154a, and segmental gear 154b to four-way valve V. In the diagrammatic embodiment of the invention illustrated, the four-way valve system includes a rotary valve core 155 in case 155a. The core has ports 156 and 157. The case is provided with supply line 158. The first port 157 is designed to be brought into register with the supply line 158 and the line 83 supplying fluid under compression to the rear of the cylinder 80 whereby to retract the saw from the cut; or to register with the exhaust line 159 of case 155a and the line 83 to permit exhaustion of the pressure back of the piston. Similarly, the port 156 connects the line 84 to the front of the cylinder 80 alternatively with the supply line 158 or with the exhaust 159 to cause the saw to be advanced to make the cut.

It will be apparent from Figure 7 that the limit switch 150 is connected by line 160 in series with a safety switch 161 upon bracket 162 carried by arm 60 of the saw rocker 59. The switch 161, in turn, is connected to positive power line 164 through which power is supplied to energize the solenoid 152. Switch 161 is moved to closed position, when the saw assembly is in completely retracted position, by means of an arm shown in Figure 1 as 165, which is secured to the extension 165a of cross bar 25 of the frame 21 by means of bolts or screws 166. An adjustable screw 167 is disposed in the downwardly bent portion 168 of the arm 165 to strike switch 161, and provides means for accurate control of the point of closing of the switch.

Means to operate the four-way valve V at the conclusion of the cutting stroke, includes a limit switch 170 similar to the switch 161 and being disposed upon the bracket 162. If desired, switch 170 may be enclosed in the same housing as the switch 161 and is provided with a button 171 projecting upon the side opposite to the side of 161. This switch is designed to be operated by adjustable screw 172 in a bracket 173 bolted, as indicated at 175, to the side of vertical side 24 of frame 21. Switch 170 is connected by means of line 176, in series with solenoid 177 which is connected to the negative power line 178, which may be shared by solenoid 152. The solenoid 177 operates or energizes plunger 179 to bring port 157 of valve V into register with supply line 158 and line 83 to cylinder 80. Fluid under compression is thus fed to the rear of the cylinder 80 to actuate the saw carriage assembly toward retracted position. It will be apparent that when the port 156 is in register with lines 84 and supply line 158, port 157 connects line 83 with exhaust 159.

The operation of the mechanism described is substantially as follows: a continuously moving brush bristle strip of the type previously described, preferably as it is being continuously formed by appropriate mechanism (not shown), is fed forwardly by rollers R while carriage 21 is retracted and while the saw cutter is in retracted position. At this stage switch 161 is closed and jaws 48 and 48a are open. The strip advances between guides 46 and 47 and also between the jaws 48, 48a and the corresponding elements 46a and the projecting portion of 46, striking the pawl 142 and pushing it aside. It continues until it strikes the operating plate 151b of the limit switch 150, thus closing the latter and making a circuit through the solenoid 152 to operate valve V in the proper direction to admit gas under compression to the rear end of the cylinder 80 through line 84.

Saw carrying rocker arm 59 is thus pneumatically actuated toward the strip to be cut and the gripping jaw 48, through the agency of spring 117, is brought into contact with the channel of the brush strip, whereby to grip the latter. Ultimately, the jaw 48a is also brought into contact with the channel of the portion of the strip to be severed. However, as previously stated, such contact is not made until relatively late in the operation. As a result of the gripping action of the jaw 48 upon the channel, the brush bristle strip, driven by rollers R, acts as an actuating member to carry the frame 21, together with the rocker assembly 59 and other movable elements supported thereby, forwardly in synchronism with the motion of the strip. While the strip is thus moving forward, the transverse cut is made therein.

At the time of completion of the cut, the severed strip is being gripped gently by the jaw 48a. Also, the screw 172 contacts the button 171 of switch 170, thus energizing the solenoid 177 to reverse the valve 155. Such reversal permits the exhaustion of the gas in the rear end of cylinder 80 and admits gas through line 83 to the forward end of the cylinder, thus causing the piston in the cylinder to reverse its movement to retract the saw assembly from the cut.

As the retracting movement progresses, the pawl 142 engages the side of the channel of the strip and as the saw carriage swings back, the pawl under the actuation of the arm 140 ejects the freshly severed strip. The ejection of such strip and subsequent opening of jaw 48 makes it possible for the frame 21, together with the assembly carried thereby, under the traction of the weight 45b, to be retracted to its starting position. The machine continues to operate automatically to sever pieces or sections of brush bristle strip of desired length so long as the strip is fed thereto or until the current controlling the solenoids 152 and 177 is shut off.

Only a preferred embodiment of the invention has been shown and described. It will be apparent to those skilled in the art that numerous modifications may be made in the various instrumentalities disclosed without departure from the spirit of the invention or the scope of the appended claims.

I claim:

1. Apparatus for cutting the channel portion of a continuously moving brush bristle strip into sections of predetermined length, comprising a carriage reciprocable longitudinally of the strip, a pair of gripping jaws, one being relatively fixed and the other relatively movable upon the carriage to grip the channel so that it moves in synchronism with the strip, a cutting saw mounted on a rocker assembly having a pivot fixed upon the carriage parallel to the strip and about which it is adapted to rotate to engage the saw with the strip, there being no type of movement between the rocker assembly and the carriage except that of rotation about said pivot, means to rock the assembly on its pivot, spring means on the carriage urging the movable jaw to close position, a linkage interconnecting said movable jaw and the rocker assembly whereby when the rocker assembly is returned after a cutting stroke, the jaw is opened, control means for the means to rock the assembly and being operated by the channel when the end thereof is in predetermined position whereby to cause the jaws to grip the channel and to effect transverse movement of the saw to cut a section of predetermined length from the channel, additional control means, operated by transverse movement of the rocker assembly in its cutting stroke, to initiate return of the rocker assembly transversely of the channel at the conclusion of the cutting stroke and to release the gripping jaw, the latter means being connected to the first-mentioned means for operation as the saw is retracted after a cut is made and means to return the carriage longitudinally of the strip to its starting position after the cutting stroke.

2. Apparatus for cutting the channel portion of a continuous brush bristle strip into sections of predetermined length comprising means longitudinally and continuously to feed said strip, a carriage reciprocable longitudinally of the strip, a pair of gripping jaws upon the carriage to grip the channel so that it moves in synchronism with the strip, a power-driven cutting saw mounted on the carriage in a plane vertical to the channel, means to move the saw on the carriage transversely of the channel to cut the latter and to return it to starting position, control means for the means to move the saw and being actuated by the channel, when the end thereof is in predetermined position, to cause the jaws to grip the channel and to effect transverse movement of the saw to cut a section of predetermined length from the channel and additional control means operated by a transverse movement of the saw in its cutting stroke, to initiate return of the saw transversely of the channel at the conclusion of the cutting stroke and the first-mentioned means and the jaws being inter-connected, whereby the jaws are closed during the cutting movement of the saw and opened during the reverse movement of the saw, and means to return the carriage longitudinally of the strip to its starting position after the cutting stroke.

3. Apparatus for cutting the channel portion of a continuously moving brush bristle strip into sections of predetermined length, comprising a carriage reciprocable longitudinally of the strip, longitudinally spaced pairs of gripping jaws on the carriage to grip the channel so that the carriage moves in synchronism with the strip, a power-driven cutting saw mounted on the carriage in a plane vertical to the channel, said plane extending between the pairs of gripping jaws, means to move the saw on the carriage transversely of the channel and to return it to starting position, control means for the means to move the saw and being actuated by the channel when the end thereof is in predetermined position, to cause the jaws to grip the channel and to effect transverse movement of the saw to cut a section of predetermined length from the channel, additional control means operated by transverse movement of the saw in its cutting stroke to initiate return of the saw transversely of the channel at the conclusion of the cutting stroke, operating means for the jaws interconnecting the latter with the first-mentioned means whereby the jaws are closed during transverse cutting movement of the saw and opened during reverse transverse movement and means to return the carriage longitudinally of the strip to its starting position after the cutting stroke.

4. Apparatus for cutting the channel portion of a continuously moving brush bristle strip into sections of predetermined length, comprising a carriage reciprocable longitudinally of the strip, a pair of gripping jaws on the carriage to grip the channel so that it moves in synchronism with the strip, a cutting saw mounted on a rocker assembly, said assembly being pivoted on the carriage on a pivot longitudinally fixed with respect to the carriage to swing transversely of the channel, means to rotate the assembly on its pivot and to return it to starting position, a first control for said means and being disposed to be actuated by the channel, when the end of the latter is in predetermined position, to cause the jaws to grip the channel and to actuate said means to rotate the assembly, whereby to cut a section of predetermined length from the channel and a second control operated by transverse movement of the rocker assembly in its cutting stroke, to initiate return of the rocker assembly at the conclusion of the cutting stroke, said assembly being operatively connected to the gripping jaws to close them during cutting movement, and to open them during return of the assembly by means permitting the jaws to remain closed until the saw has cleared the channel and means to return the carriage longitudinally of the strip to its starting position after the cutting stroke.

5. Apparatus for cutting the channel portion of a continuously moving brush bristle strip into sections of predetermined length, comprising a carriage reciprocable longitudinally of the strip, a pair of gripping jaws, one being relatively fixed upon the carriage and the other being relatively movable to grip the channel so that it moves in synchronism with the strip, a saw-carrying rocker assembly, the assembly having a pivot fixed upon the carriage parallel to the strip and about which it is adapted to rotate to engage the saw with the channel, there being no type of movement between the rocker assembly and the carriage except that of rotation about said pivot, means to rotate the assembly on its pivot, spring means on the carriage urging the movable jaw to closed position and a linkage interconnecting the jaw and the rocker assembly, said linkage including overtravel means permitting the jaws to remain closed under the action of the spring means until the saw has cleared the channel in its reverse movement whereby when the rocker assembly is returned after a cutting stroke, the jaw is opened to permit relative movement between the carriage and the strip.

6. Apparatus for cutting the channel portion of a continuously moving brush bristle strip into sections of predetermined length, comprising a carriage reciprocable longitudinally of the strip, a pair of gripping jaws, one being relatively fixed and the other relatively movable upon the carriage to grip the channel so that it moves in synchronism with the strip, a cutting saw mounted on a rocker assembly having a pivot fixed upon the carriage parallel to the strip and about which it is adapted to rotate to engage the saw with the channel, there being no type of movement between the carriage and the rocker assembly except that of rotation of the latter about said pivot, means to rock the assembly on its pivot, spring means on the carriage urging the movable jaw to close position, a linkage interconnecting said movable jaw and the rocker assembly whereby when the rocker assembly is returned after a cutting stroke, the jaw is opened, control means for the means to rock the assembly and being operated by the channel when the end thereof is in predetermined position whereby to cause the jaws to grip the channel and to effect transverse movement of the saw to cut a section of predetermined length from the channel, additional control means operated by transverse movement of the rocker assembly in its cutting stroke, to initiate return of the rocker assembly transversely of the channel at the conclusion of the cutting stroke and to release the gripping jaw and means to return the carriage longitudinally of the strip to its starting position after the cutting stroke.

7. Apparatus for cutting the channel portion of a continuously moving brush bristle strip into sections of predetermined length, comprising a carriage reciprocable longitudinally of the strip, a pair of gripping jaws, one being relatively fixed and the other relatively movable upon the carriage, to grip the channel so that the carriage moves in synchronism with the strip, a power-driven cutting saw mounted upon a rocker assembly, said assembly having a pivot fixed upon the carriage parallel to the strip and about which it is adapted to rotate to engage the saw with the channel there being no type of movement between the carriage and the rocker assembly except that of rotation of the assembly about said pivot, a spring connected to the carriage and to the movable jaw to urge the latter to closed position and a linkage interconnecting said movable jaw and the rocker assembly, whereby when the rocker assembly is returned to starting position after a cutting stroke the jaw is opened against the spring, said linkage including means permitting overtravel of the rocker arm to effect the cut by the saw upon the channel after the jaw is closed to gripping position, actuating means for the rocker assembly adapted to swing the assembly to and from cutting position, control means adapted to cause operation of the latter means and being actuated by the channel when the end thereof is in predetermined position, whereby to cause the jaws to grip the channel and to effect movement of the saw to cut a section of predetermined length from the channel and additional control means operated by movement of the assembly in its cutting stroke, to initiate return of the saw transversely of the channel at the conclusion of the cutting stroke and to release the gripping jaws and means to return the carriage longitudinally of the strip to its starting position, after the cutting sroke.

8. Apparatus for cutting the channel portion of a continuously moving brush bristle strip into sections of predetermined length, comprising a carriage reciprocable longitudinally of the strip, a pair of gripping jaws, one being fixed on the carriage and the other movable with respect thereto to grip the channel so that the carriage moves in synchronism with the strip, a cutting saw mounted on a rocker arm pivoted on the carriage and being adapted to move in a plane transverse of the brush strip, pneumatic means interconnecting the rocker assembly and the carriage to swing the rocker assembly to and from the channel, hose lines to admit pressure to and to release pressure from the pneumatic means, an electrically operated four-way valve connected to the hose lines and being adapted to establish pressure in the pneumatic means, to swing the rocker assembly to and away from the channel, a limit switch disposed in the path of the channel and adapted to be operated by contact of the end of the latter, said switch being connected to said valve, whereby closing of the switch by the channel operates the pneumatic means to cause the rocker assembly to be swung toward the channel, an additional switch operated by the rocker assembly and being connected to said valve, to reverse the movement of the rocker assembly at the completion of the cut and a linkage between said rocker assembly and the movable jaw whereby the movable jaw is closed at the beginning of the cutting stroke of the rocker assembly and is opened at the conclusion thereof.

9. Apparatus for cutting the channel portion of a continuously moving brush bristle strip into sections of predetermined length, comprising a carriage reciprocable longitudinally of the strip, a pair of gripping jaws, on the carriage operable to grip the channel so that the carriage moves in synchronism with the strip, a power-driven cutting saw mounted on a rocker arm pivoted on the carriage and being adapted to move in a plane transverse of the brush strip, pneumatic means interconnecting the rocker assembly and the carriage to swing the rocker assembly to and from the channel, hose connections to admit pressure to and to release pressure from the pneumatic means, four-way control valve means electrically actuated and connecting said pneumatic means to a pressure line to admit pressure to the pneumatic means selectively to swing the rocker assembly to or away from the channel; a limit switch disposed in the path of the channel and adapted to be operated by contact of the end of the latter, said switch being connected to said valve means, whereby closing of the switch by the channel operates the pneumatic means to cause the rocker assembly to be swung towards the channel, an additional switch operated by the rocker assembly and being connected to said valve means to reverse the movement of the rocker assembly at the completion of the cut and a linkage between said rocker assembly and the movable jaw whereby the movable jaw is closed at the beginning of the cutting stroke of the rocker assembly and is opened at the conclusion thereof, said apparatus further including an ejector for a severed piece of brush strip, said ejector being operatively connected to said rocker assembly whereby backward movement of the rocker assembly away from the channel causes the severed portion of the strip to be ejected from the apparatus.

10. Apparatus as defined in claim 9 in which the ejector is mounted upon the carriage and is controlled by a link device connecting it to the rocker assembly.

11. Apparatus for cutting into sections a continuously moving brush bristle strip, said strip comprising an elongated metallic channel and bristles secured in the channel; said apparatus comprising a carriage mounted for longitudinal movement with the channel; a rocker assembly mounted on the carriage and being mounted upon a pivot fixed upon the carriage parallel to said strip and about which it is adapted to rotate to engage the saw with the channel, there being no type of movement between the rocker assembly and the carriage except rotation about said pivot, a power-driven saw upon the assembly and having its plane disposed perpendicular to the channel for cutting the channel; means to rotate the assembly comprising a cylinder fixed upon the carriage and a fluid actuated piston mounted therein and having a rod projecting from the cylinder and being operatively connected to swing the rocker assembly to and from the channel; means upon the carriage so to grip the channel that the channel and carriage move as a unit while a cut is being made in the channel and to release the same after the saw has been retracted; valve means connected by conduits to opposite ends of the cylinder and being connected to a source of fluid under compression to actuate the piston; electrical solenoid means to actuate the valve to admit fluid to said cylinder at a predetermined end thereof, an electrical switch fixed on the carriage for closing the circuit of said solenoid to operate the valve whereby to effect a cutting stroke of the rocker assembly, a second electrical switch having control means disposed to be operated by movement of the rocker assembly during the cutting stroke whereby to operate the valve at the conclusion of the cutting stroke to return the rocker assembly to its original position.

References Cited in the file of this patent

UNITED STATES PATENTS

| | | |
|---|---|---|
| 1,439,963 | Kamper | Dec. 26, 1922 |
| 1,859,319 | Sussman | May 24, 1932 |
| 2,209,995 | Morris | Aug. 6, 1940 |
| 2,627,922 | Teall | Feb. 10, 1953 |